United States Patent [19]

Lapp

[11] Patent Number: 5,156,925
[45] Date of Patent: Oct. 20, 1992

[54] HYDROGEN REMOVAL SYSTEM FOR METAL/AIR CELL

[75] Inventor: Steven P. Lapp, Sydenham, Canada

[73] Assignee: Alcan International Limited, Montreal, Canada

[21] Appl. No.: 773,511

[22] Filed: Oct. 9, 1991

[51] Int. Cl.$^5$ .......................... H01M 8/18; H01M 8/04
[52] U.S. Cl. ........................................ 429/19; 429/14; 429/17; 429/27; 429/34
[58] Field of Search ................. 429/17, 19, 27, 14, 429/39, 38, 34

[56] References Cited

U.S. PATENT DOCUMENTS

| | | | |
|---|---|---|---|
| 4,490,443 | 12/1984 | Ruch et al. | 429/34 X |
| 4,702,972 | 10/1987 | Matsumoto | 429/38 X |
| 4,950,561 | 8/1990 | Niksa et al. | 429/27 |
| 4,994,332 | 2/1991 | Coin et al. | 429/27 |

Primary Examiner—John S. Maples
Attorney, Agent, or Firm—Cooper & Dunham

[57] ABSTRACT

A metal/air fuel cell is described in which hydrogen is effectively removed from a cell stack and electrolyte storage tank without emitting caustic vapor or mist. The fuel cell comprises: (a) a fuel cell assembly housing, (b) a plurality of metal/air cells disposed in the housing, (c) an electrolyte storage tank, (d) a recirculation loop for continuously recirculating electrolyte from the storage tank through the metal/air cells, (e) air injection means for flowing air between the metal/air cells, (f) a degassing vessel connected to the recirculating loop to receive electrolyte containing hydrogen gas from the metal/air cells, the vessel being arranged to discharge hydrogen gas through a top opening and discharge electrolyte through a bottom outlet for return to the storage tank and this vessel being further arranged to have at least the top portion thereof bathed in air which has passed between the metal/air cells, (g) purging air means adapted to pass air through the electrolyte storage tank and then through the degassing vessel, said purging air serving to dilute the hydrogen and to remove hydrogen from the storage tank, (h) a gas discharge conduit for drawing off purge air and hydrogen discharging from the degassing vessel and (i) filter means connected to said discharge conduit for removing caustic vapor or mist from the discharging purge air and hydrogen.

4 Claims, 4 Drawing Sheets

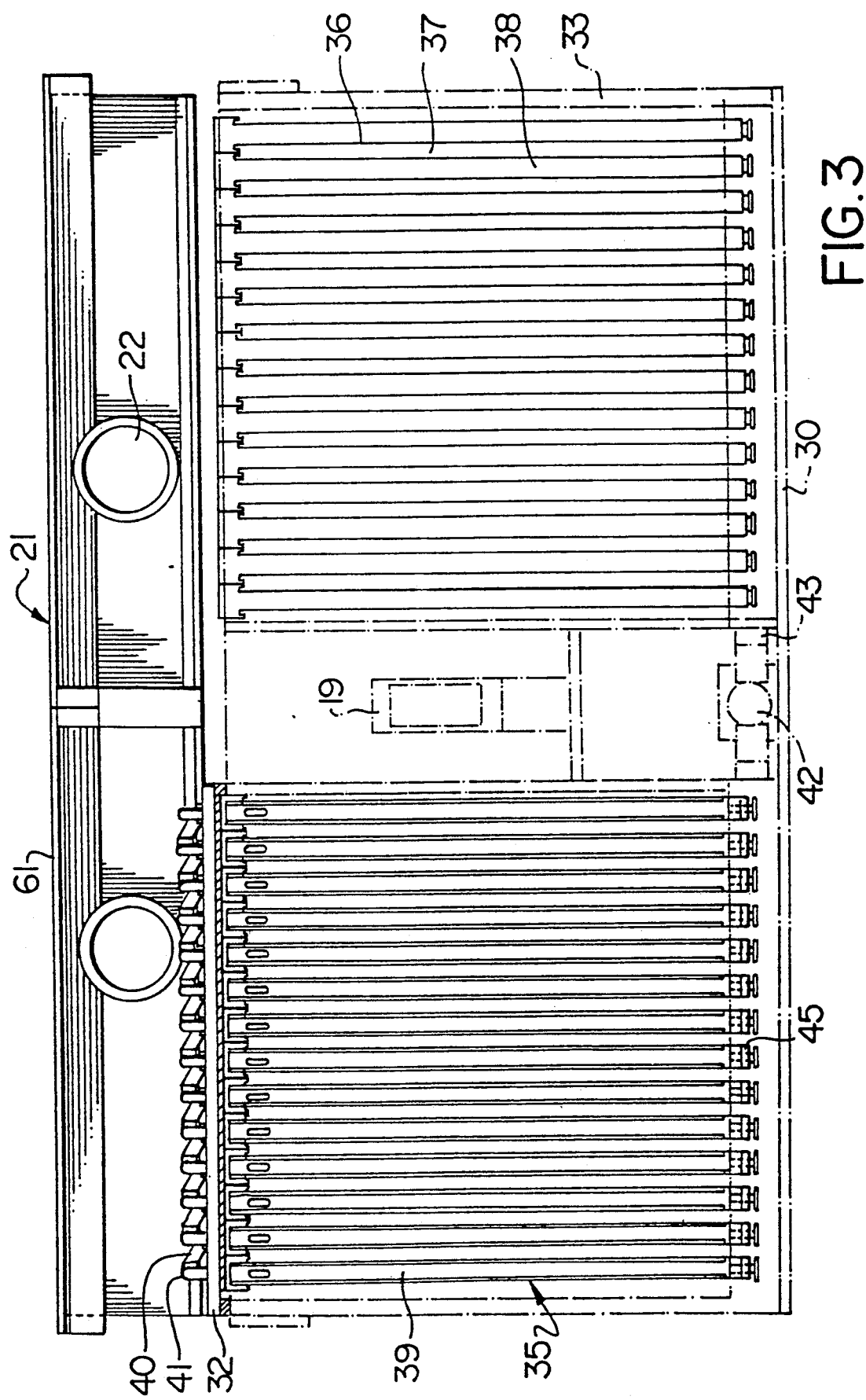

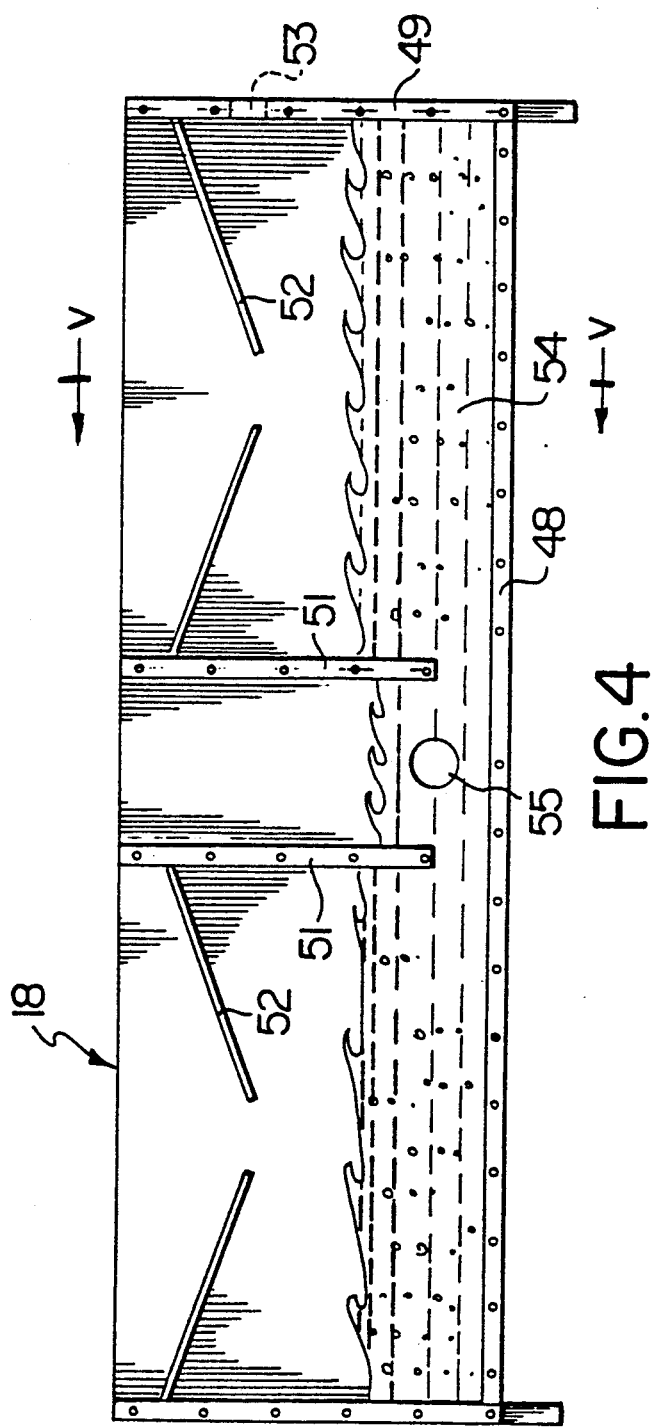

HYDROGEN REMOVAL SYSTEM FOR METAL/AIR CELL

BACKGROUND OF THE INVENTION

The invention relates to metal/air fuel cells, and particularly to a hydrogen removal system for such fuel cells having recirculating electrolyte.

Metal/air fuel cells or batteries produce electricity by the electro-chemical coupling of a reactive metallic anode to an air cathode through a suitable electrolyte in a cell. The air cathode is typically a sheet-like member, having opposite surfaces respectively exposed to air and to the aqueous electrolyte of the cell. During cell operation, oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added dissociation-promoting catalyst) in association with a finely divided hydrophobic polymeric material and incorporating a metal screen as the conductive element. A variety of anode metals have been used or proposed; among them, zinc, alloys of aluminum and alloys of magnesium are considered especially advantageous for particular applications, owing to their low cost, light weight and ability to function as anodes in metal/air fuel cells using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. A typical fuel cell unit or battery comprises a plurality of such cells.

Aqueous electrolytes for metal-air fuel cells consist of two basic types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

In alkaline electrolytes, the cell discharge reaction may be written:

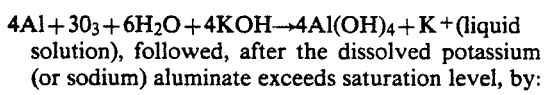

solution), followed, after the dissolved potassium (or sodium) aluminate exceeds saturation level, by:

In addition to the above oxygen-reducing reactions, there is also an undesirable, non-beneficial reaction of aluminum in both types of electrolyte to form hydrogen, as follows:

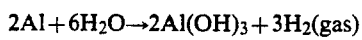

When a metal/air fuel cell is operated, quantities of hydrogen form from the surface of the anode. As with other fuel cells or batteries this hydrogen can reach explosive concentrations.

Metal/air fuel cells are of particular interest as a fuel source for motorized vehicles and when they are used for this purpose it is important to keep the hydrogen level in the fuel cell, vehicle and vehicle surroundings below the flammable limit of about 4% by volume. Also when the cells are used in vehicles, the low hydrogen level must be achieved without emitting caustic vapour or mist from the system.

A battery intended as an emergency power supply is described in U.S. Pat. No. 4,490,443, issued Dec. 25, 1984. That battery uses a plurality of individual metal air cells with an electrolyte recirculated through the cells by means of a centrifugal or impeller pump. It is capable of operating under high load, but it has a major disadvantage in that it does not provide a satisfactory means for avoiding hydrogen build-up in the electrolyte reservoir.

U.S. Pat. No. 4,994,332 describes another form of metal/air battery with an alkali metal hydroxide electrolyte circulating through battery cells by means of a pump. The electrolyte exiting from the cells is fed to a knock-out vessel for hydrogen removal from the system. The hydrogen is discharged through an exhaust line.

U.S. Pat. No. 4,950,561 describes a metal/air battery with multiple cells which again recognizes the problem of hydrogen generation in the cells. In that design, the hydrogen gas which is generated either flows with the electrolyte or is exhausted through the electrolyte outlet line into an electrolyte reservoir.

It is the object of the present invention to develop a battery system capable of effectively removing hydrogen from a fuel cell and its electrolyte storage tank without emitting caustic vapour or mist from the system.

SUMMARY OF THE INVENTION

The present invention in its broadest aspect relates to a metal/air fuel cell assembly comprising:

(a) a fuel cell assembly housing, (b) a plurality of metal/air cells disposed in the housing, (c) an electrolyte storage tank, (d) a recirculation loop for continuously recirculating electrolyte from the storage tank through the metal/air cells, (e) air injection means for flowing air between the metal/air cells, (f) a degassing vessel connected to the recirculating loop to receive electrolyte containing hydrogen gas from the metal/air cells, the vessel being arranged to discharge hydrogen gas through a top opening and discharge electrolyte through a bottom outlet for return to the storage tank and this vessel being further arranged to have at least the top portion thereof bathed in air which has passed between the metal/air cells, (g) purging air means adapted to pass air through the electrolyte storage tank and then through the degassing vessel, said purging air serving to dilute the hydrogen and to remove hydrogen from the storage tank, (h) a gas discharge conduit for drawing off purge air and hydrogen discharging from the degassing vessel and (i) filter means connected to said discharge conduit for removing caustic vapour or mist from the discharging purge air and hydrogen.

With the system of this invention, the hydrogen which is generated at the anode surfaces is carried out of the metal/air cells by the recirculating electrolyte and most of the hydrogen in the electrolyte is removed in the degassing vessel. Most of the hydrogen is removed by a series of preferably angled baffles covered with a porous non-woven material offering high surface area, e.g. 3M Scotchbrite ®. Residual hydrogen in the form of very small bubbles, typically about 4% by volume, is carried back to the electrolyte storage tank with the recycled electrolyte from the degassing vessel. This hydrogen gradually evolves from the liquid in the storage tank and the purging air system is used to purge the top of the storage tank with air to keep the hydrogen level below about 2%. When the fuel cell is used in a vehicle, some liquid is inevitably entrained in the purge air stream because of vehicle motion and this is carried with the air back to the degassing vessel.

The degassing vessel is preferably positioned within the battery housing together with the metal/air cells such that the degassing vessel may be bathed in a stream of the air exhausting from between the metal/air cells. This air picks up and dilutes the hydrogen evolving from the degassing vessel and this mixture of air and hydrogen, also containing caustic vapour or mist, is discharged through a discharge conduit. To avoid contaminating the atmosphere, the discharging air and hydrogen is filtered first by a coarse non-woven filter, e.g. Scotchbrite ® material available from 3M Co. and then by a fine automotive-type air intake paper filter before being exhausted into the atmosphere. The coarse non-woven filter removes droplets of caustic, while the filter paper removes any very fine mist particles. This system provides excellent odour control with no noticeable caustic mist.

BRIEF DESCRIPTION OF THE DRAWINGS

Further features of the present invention will become apparent to those skilled in the art to which the present invention relates from reading the following specification with reference to the accompanying drawings, in which:

FIG. 3 is a side elevation in partial section showing the fuel cell of FIG. 2;

FIG. 4 is a sectional elevation of an electrolyte/gas separator vessel;

FIG. 5 is a sectional view along line V—V of FIG. 4;

DESCRIPTION OF THE PREFERRED EMBODIMENTS

The present invention is particularly useful in an electrolyte circulation system for an aluminum/air fuel cell.

Figure 1:
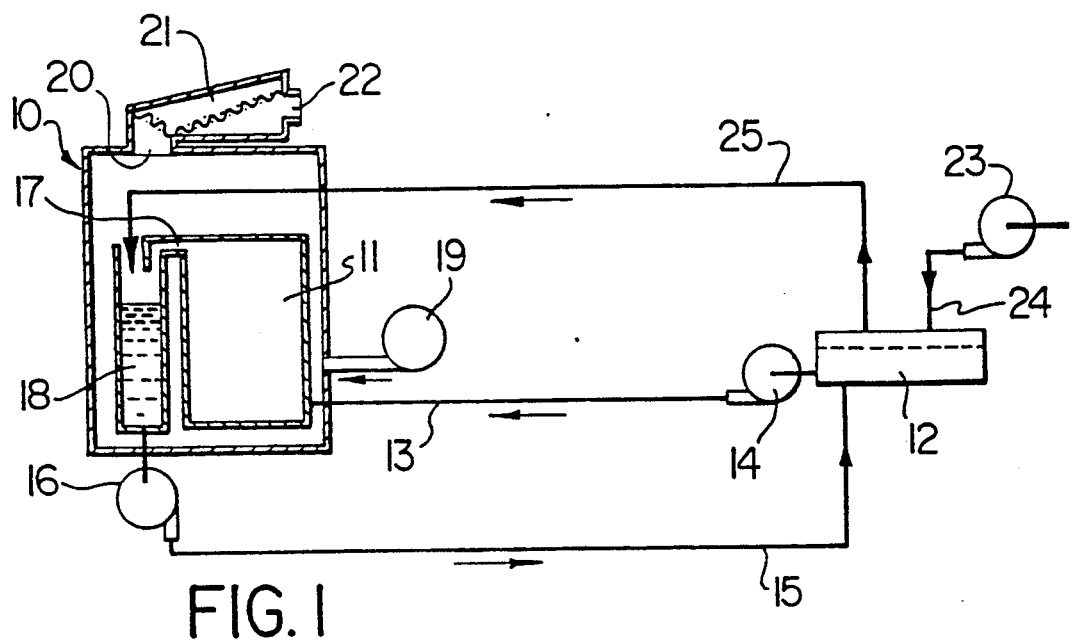
FIG. 1 is a schematic flow diagram illustrating a preferred embodiment of the present invention.

The general concept of this invention is illustrated by the schematic flow sheet of FIG. 1 which shows a main fuel cell case or housing 10 containing aluminum-air fuel cell stacks 11. Alkaline electrolyte, e.g. a solution of NaOH or KOH, is stored in storage tank 12 and is pumped via inlet line 13 and pump 14 into the bottom of the aluminum-air cells. The used electrolyte is returned via electrolyte return line 15 and recycle pump 16. Air is fed to the fuel cell stacks 11 by an air feed pump 19.

The fuel cell generates hydrogen and some of this is trapped in the electrolyte in the form of very small bubbles. A mixture of electrolyte and hydrogen discharges through top outlet 17 into an electrolyte/gas separator or degassing vessel 18. The electrolyte is largely degassed in this vessel with the separating hydrogen passing upwardly through air open top. It proceeds through outlet 20 and into a filter assembly 21 for removing caustic mist and caustic droplets with hydrogen and air substantially free of caustic being discharged to the atmosphere through discharge outlet 22.

The electrolyte in the degassing vessel 18 continues to contain some residual hydrogen in the form of very small bubbles, typically in the amount of about 4% by volume, and this is carried back to reservoir 12 through return line 15. In the reservoir, the hydrogen gradually separates from the liquid. In order to keep the concentration of hydrogen in the space above the electrolyte in storage tank 12 below about 2% by volume, purge air is pumped into the top of tank 12 by way of air pump 23 and air line 24. This purge air dilutes and collects hydrogen from tank 12 and this mixture then passes via purge line 25 back to the degassing vessel 18.

This degassing vessel 18 is also bathed in a stream of air originating from air feed 19 and exhausting from the aluminum-air cells 11 and the air which is discharged through outlet 20 is a mixture of the air exhausting from the aluminum-air cells 11 and the purge air from line 25.

The various components of the flow sheet of FIG. 1 will now be described in greater detail with reference to FIG. 2 to 7. As can be seen from FIGS. 2 and 3, the fuel cell housing 10 contains 4 stacks of aluminum-air cells 35 with each stack containing 14 such aluminum-air cells thereby providing a total of 56 cells in the complete fuel cell assembly. In this particular unit, each anode has an area of approximately 950 cm$^2$ and the electrolyte circulates at a rate of about 25 l/min, giving a total power output of about 8 Kw.

The fuel cell housing 10 includes a bottom wall 30, side wall 31, a top wall 32 and end wall 33. These are made from a chemical resistant plastic material, such as polyvinylchloride or polyphenylene oxide. The aluminum-air cells 35 are each made up of cathode walls 36 with air gaps 37 therebetween for the passage of oxidizing air. The cathode walls 36 also form therebetween electrolyte passages 38 through which electrolyte moves from bottom to top. Each of these electrolyte passages 38 contains an aluminum anode 39 which is mounted at the top end thereof to top wall 32 with an electrical connector 65 passing from each anode 39 up through the top wall 32 and connecting to an anode busbar 40. The electrical connection to the cathodes is made by way of cathode connector tabs 41.

The electrolyte being pumped from the reservoir 12 enters the fuel cell via inlet 42 and it travels along manifold 43 in the bottom region of the housing. Extending from this manifold 43 are a series of flow tubes 44 with one of these flow tubes being used for each aluminum-air cell as can be seen from FIG. 7. The electrolyte enters each aluminum-air cell by way of individual flow passages 45.

Figure 2:
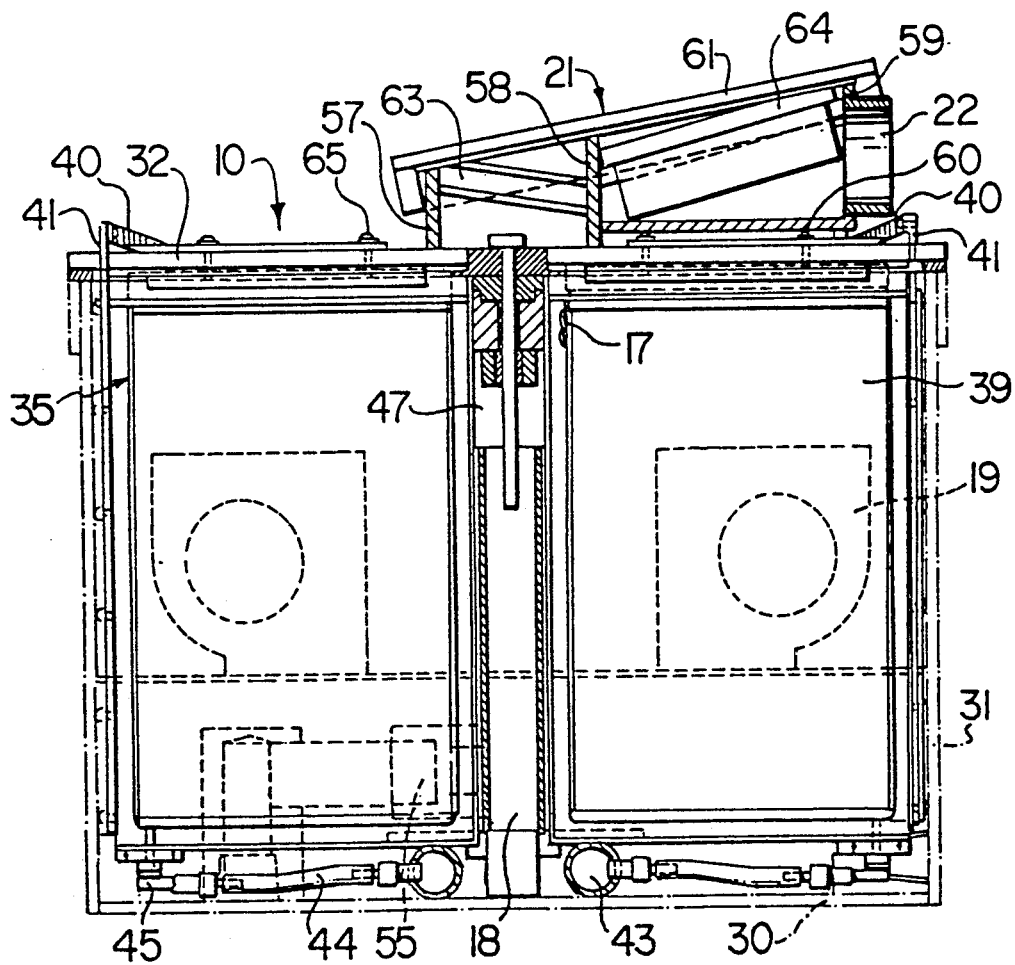
FIG. 2 is an end elevation in partial section showing a fuel cell according to this invention.
Figure 6:
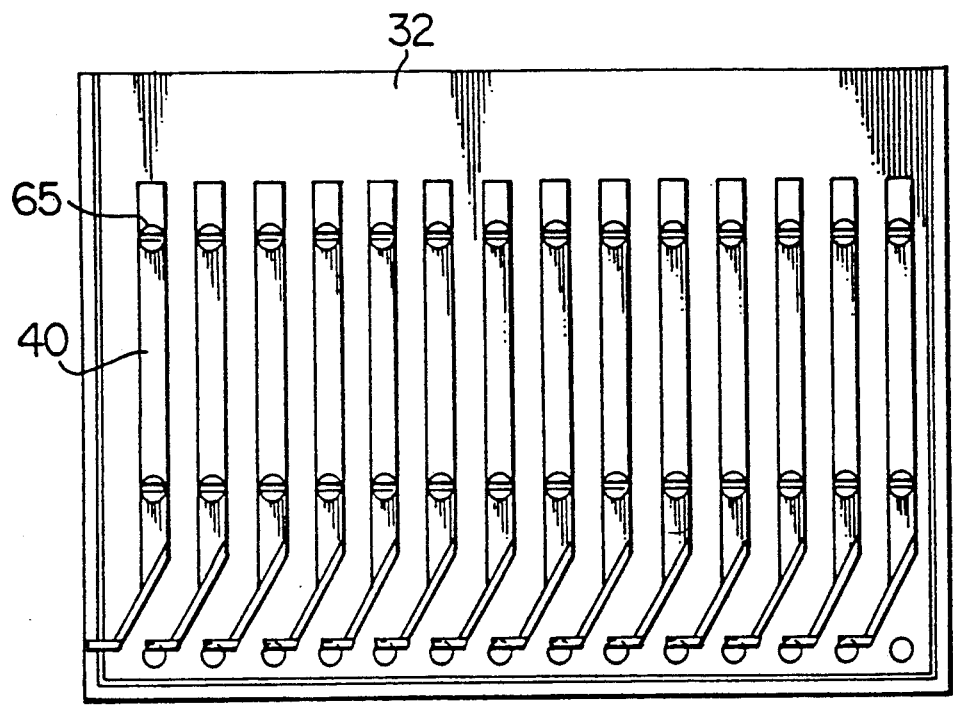
FIG. 6 is a top plan view of a refuelling rack.
Figure 7:
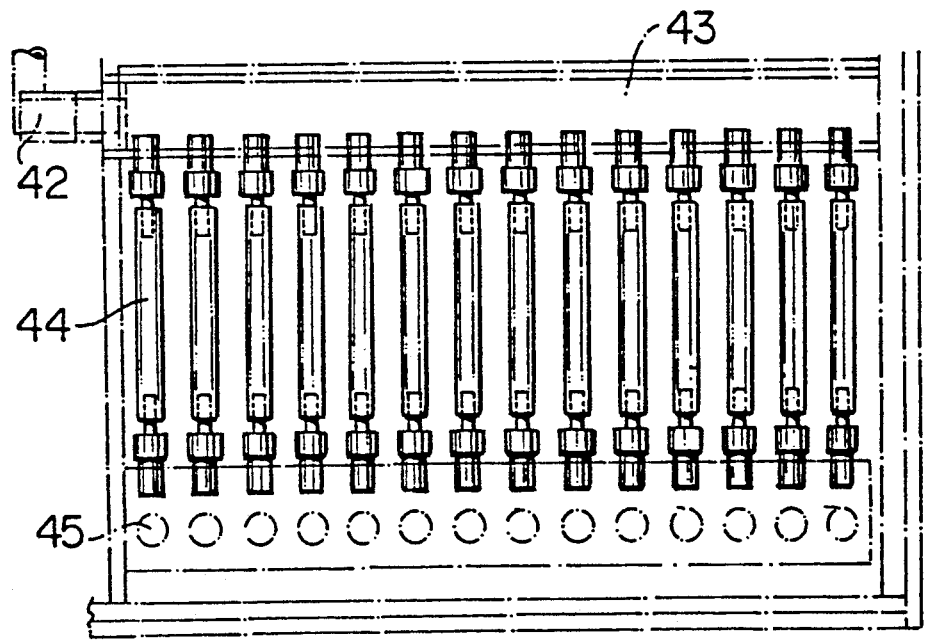
FIG. 7 is a partial sectional view showing an electrolyte feed arrangement.

As shown in FIG. 2, the used electrolyte and hydrogen gas discharge through top outlet 17 and into an electrolyte/gas separator or degassing vessel 18.

The degassing vessel 18 can be seen in FIG. 2 between the two longitudinal stacks of aluminum-air cells as a long narrow reservoir. It is described in greater detail in FIGS. 4 and 5 where it is seen to include a bottom wall 48, end walls 49, side walls 50 and divider walls 51 extending downwardly from the top of the separator vessel while being spaced from the bottom 48 thereof. The separator vessel contains downwardly sloped baffles 52 covered with a porous non-woven material offering high surface area, e.g. 3M Scotchbrite ®. The mixture of electrolyte and gas entering the degassing vessel 18 from the aluminum-air cells flows over the baffles and drains into the degassing vessel. The purge air stream 25 enters the degassing vessel via inlet 53 positioned below the baffles 52. The electrolyte 54 being recycled to the storage tank is discharged from the gas separator through outlet 55.

The mixture of air, hydrogen, caustic mist and caustic particles rising from the degassing vessel 18 travelled through discharge outlet 47 and then passes through the exhaust filter 21 mounted on top of the fuel cell housing 10. This filter includes side walls 57 and 59, an intermediate wall 58, a bottom wall 60 between walls 58 and 59 and an inclined top wall 61. The exhaust gases enter between walls 57 and 58 and the clean air and gas being discharged exits through outlets 22. The inlet portion includes a filter 63 made of pads of Scotchbrite ® material for filtering out caustic droplets and an automotive air-intake paper filter 64 for removing any fine mist. The gases being discharged through outlet 22 contain little or no caustic mist or droplets.

From the above description of a preferred embodiment of the invention, those skilled in the art will perceive improvements, changes and modifications. Such improvements, changes and modifications within the skill of the art are intended to be covered by the appended claims.

What is claimed is:
1. A fuel cell assembly comprising:
(a) a housing,
(b) a plurality of metal/air cells disposed in the housing,
(c) an electrolyte storage tank,
(d) a recirculation loop for continuously recirculating electrolyte from the storage tank through the metal/air cells,
(e) air blower means for flowing air between the metal/air cells,
(f) a degassing vessel connected to the recirculating loop to receive electrolyte containing hydrogen gas from the metal/air cells, the vessel being arranged to discharge hydrogen gas through a top opening and discharge electrolyte through a bottom outlet for return to the storage tank and this vessel being further arranged to have at least the top portion thereof bathed in air which has passed between the metal/air cells,
(g) purging air means adapted to pass air through the electrolyte storage tank and then through the degassing vessel, said purging air serving to dilute the hydrogen and to remove hydrogen from the storage tank,
(h) a gas discharge conduit for drawing off air and hydrogen discharging from the degassing vessel and
(i) filter means connected to said discharge conduit for removing caustic vapour or mist from the discharging air and hydrogen.

2. A battery according to claim 1 wherein the degassing vessel is also within said battery housing.

3. A battery according to claim 2 wherein the degassing vessel contains a plurality of baffles covered with porous, high surface area, non-woven material.

4. A battery according to claim 3 wherein the gas discharge filter means comprises a first stage consisting of a coarse non-woven filter and a second stage consisting of a fine filter paper.

* * * * *